United States Patent
Atkins

(10) Patent No.: US 12,516,249 B2
(45) Date of Patent: Jan. 6, 2026

(54) CONVERTING BIOMASS TO DIESEL

(71) Applicant: ABUNDIA BIOMASS-TO-LIQUIDS LIMITED, Redcar (GB)

(72) Inventor: Martin Atkins, Redcar (GB)

( * ) Notice: Subject to any disclaimer, the term of this patent is extended or adjusted under 35 U.S.C. 154(b) by 0 days.

(21) Appl. No.: 18/028,534

(22) PCT Filed: Sep. 23, 2021

(86) PCT No.: PCT/EP2021/076262
§ 371 (c)(1),
(2) Date: Mar. 25, 2023

(87) PCT Pub. No.: WO2022/063930
PCT Pub. Date: Mar. 31, 2022

(65) Prior Publication Data
US 2023/0357642 A1    Nov. 9, 2023

(30) Foreign Application Priority Data
Sep. 25, 2020 (GB) .................... 2015244

(51) Int. Cl.
*C10G 1/06* (2006.01)
*C10G 65/12* (2006.01)

(52) U.S. Cl.
CPC .............. *C10G 1/06* (2013.01); *C10G 65/12* (2013.01); *C10G 2300/1014* (2013.01);
(Continued)

(58) Field of Classification Search
CPC ......... C10B 53/02; C10B 57/10; C10B 57/16; C10B 53/00; C10G 1/06;
(Continued)

(56) References Cited

U.S. PATENT DOCUMENTS 8,425,633 B2 * 4/2013 Banasiak ............... C10B 57/08
585/242
2009/0259082 A1 * 10/2009 Deluga .................. C10G 35/00
422/600
(Continued)

FOREIGN PATENT DOCUMENTS

BE    1017136 A6    3/2008
CN    103059896 A    4/2013
(Continued)

OTHER PUBLICATIONS

Zhang Yan et al: "Peculiarities of Rapid Pyrolysis of Biomass Covering Medium- and High-Temperature Ranges", Energy & Fuels, vol. 20, No. 6, Nov. 1, 2006 (Nov. 1, 2006), pp. 2705-2712 (Year: 2006).*

(Continued)

*Primary Examiner* — Ellen M Mcavoy
*Assistant Examiner* — Chantel Graham
(74) *Attorney, Agent, or Firm* — Young Basile Hanlon & MacFarlane, P.C.

(57) ABSTRACT

The present invention relates to a process and system for forming a hydrocarbon feedstock from a biomass material, and the hydrocarbon feedstock formed therefrom. The present invention also relates to a process and system for forming a bio-derived diesel fuel from a hydrocarbon feedstock, and the bio-derived diesel fuel formed therefrom, as well as intermediate treated hydrocarbon feedstocks formed during the process.

20 Claims, 2 Drawing Sheets

(52) U.S. Cl.
CPC . *C10G 2300/202* (2013.01); *C10G 2300/208* (2013.01); *C10G 2300/304* (2013.01); *C10G 2300/4006* (2013.01); *C10G 2300/4012* (2013.01); *C10G 2300/4081* (2013.01); *C10G 2300/70* (2013.01); *C10G 2400/04* (2013.01)

(58) Field of Classification Search
CPC ...... C10G 2300/1014; C10G 2300/202; C10G 2300/208; C10G 2300/304; C10G 2300/4006; C10G 2300/4012; C10G 2300/4081; C10G 2300/70; C10G 2400/04; C10G 3/46; C10G 3/49; C10G 31/09; C10G 45/08; C10G 45/12; C10G 45/62; C10G 45/64; C10G 49/04; C10G 49/06; C10G 49/08; C10G 65/12; C10G 1/00; C10L 1/08; C10L 1/00; Y02E 50/10; Y02E 50/30; Y02P 20/145; Y02P 30/20

See application file for complete search history.

(56) References Cited

U.S. PATENT DOCUMENTS

| | | | | |
|---|---|---|---|---|
| 2011/0258914 A1* | 10/2011 | Banasiak | ............ | C10K 1/02 44/605 |
| 2012/0116138 A1* | 5/2012 | Goodall | ............ | C10G 65/046 585/603 |
| 2013/0131196 A1 | 5/2013 | Cheiky et al. | | |
| 2014/0097123 A1* | 4/2014 | Armistead | ............ | C10G 45/02 208/264 |
| 2016/0257889 A1* | 9/2016 | Abdullah | ............ | C10G 3/46 |
| 2017/0002270 A1* | 1/2017 | Shi | ............ | C10G 1/002 |

FOREIGN PATENT DOCUMENTS

| | | |
|---|---|---|
| CN | 103980947 A | 8/2014 |
| CN | 106939171 A | 7/2017 |
| CN | 106977068 A | 7/2017 |
| EP | 2177590 A1 | 4/2010 |
| WO | 2006/103668 A2 | 10/2006 |
| WO | 2006/103668 A3 | 10/2006 |
| WO | 2018/000050 A1 | 1/2018 |

OTHER PUBLICATIONS

Santiago Septien et al: "Effect of particle size and temperature on woody biomass fast pyrolysis at high temperature (10001400C)", Fuel, IPC SI ENCE and Technology Press, Guildford, GB, vol. 97, Jan. 24, 2012 (Jan. 24, 2012), pp. 202-210 (Year: 2012).*

International Search Report and Written Opinion of corresponding International Application No. PCT/EP2021/076262 mailed Mar. 4, 2022, all enclosed pages cited.

Invitation to Pay Additional Fees of corresponding International Application No. PCT/EP2021/076262 mailed Jan. 11, 2022, all enclosed pages cited.

Harter, et al., "Destilacao Atmosferica do biodiesel derivado do oleo de macauba ou do palmiste para obtencao da fracao de esteres leves para uso como combustivel de aviacao," Quim. Nova, vol. XY, No. 00, all enclosed pages cited.

Septien, et al., Effect of particle size and temperature on woody biomass fast pyrolysis at high temperature (1000-1400C), Fuel 97 (2012), all enclosed pages cited.

Search Report of corresponding British application No. 2015244.3 mailed Oct. 29, 2020, all enclosed pages cited.

Zhang, et al., "Peculiarities of rapid pyrolysis of biomass covering medium- and high-temperature ranges," Energy & Fuels, 2006, 20, all enclosed pages cited.

"New Energy and Renewable Energy Technology, 2nd Edition", edited by Li Chuantong, pp. 129-133, Southeast University Press, 2nd edition in Aug. 2012.

Chinese First Office Action with English Translation for corresponding Chinese Patent Application No. 202180072746.1, issued May 23, 2025, 16 pages.

* cited by examiner

CONVERTING BIOMASS TO DIESEL

This application is a U.S. National Stage Entry Application of PCT/EP2021/076262 filed Sep. 23, 2021, which claims priority to British patent application no. GB 2015244.3 filed Sep. 25, 2020, the disclosures of which are incorporated herein by reference in their entirety.

FIELD OF INVENTION

The present invention relates to a process and system for forming a hydrocarbon feedstock from a biomass material, and the hydrocarbon feedstock formed therefrom. The present invention also relates to a process and system for forming a bio-derived diesel fuel from a hydrocarbon feedstock, and the bio-derived diesel formed therefrom, as well as intermediate treated hydrocarbon feedstocks formed during the process.

BACKGROUND

Demand for energy has increased over the years due to greater dependence on technology both in a personal and commercial capacity, expanding global population and the required technological progress made in developing countries. Energy resources have traditionally been derived primarily from fossil fuels however, as supply of such resources declines, a greater significance is placed on research looking at alternative methods of providing energy. Further, increased awareness of the environmental impact of burning fossil fuels and commitments to reducing the emission of greenhouse gases has significantly increased the demand for greener energy resources.

Bio-fuels are considered to be a promising, more environmentally-friendly alternative to fossil fuels, in particular, diesel, naphtha, gasoline and jet fuel. Presently, such materials are only partly replaced with bio-derived fuels through blending. Due to the costs associated with the formation of some bio-fuels it is not yet commercially viable to manufacture fuels entirely derived from biomass materials. Even where bio-derived fuels are combined with fossil fuels, difficulties in blending some bio-derived fuels can lead to extended processing times and higher costs.

The term biomass is commonly used with respect to materials formed from plant-based sources, such as corn, soy beans, flaxseed, rapeseed, sugar cane, and palm oil, however this term encompasses materials formed from any recently living organisms, or their metabolic by-products. Biomass materials comprise lower amounts of nitrogen and sulphur compared to fossil fuels and produces no net increase in atmospheric $CO_2$ levels, and so the formation of an economically viable bio-derived fuel would be environmentally beneficial.

High quality fossil fuels, such as diesel and jet fuel are formed by refining crude oils. The diesel fuels produced mainly comprise saturated paraffins, including n-, iso- and cycloparaffins, but also comprise aromatic hydrocarbons, such as naphthalenes and alkylbenzene. Diesel fuels typically undergo additional refining/upgrading processes, including hydro-treating processes to reduce the amount of sulphur present, catalytic cracking and/or hydrocracking to reduce the presence of larger hydrocarbon compounds, and optionally blending with other streams, in order to produce a fuel meeting all of the requisite chemical, physical, economic and inventory requirements of a diesel fuel product.

Fossil fuel-based diesels are formed from a complex mixture of hydrocarbon compounds, wherein the majority of hydrocarbon compounds comprise a carbon number of between 10 and 22.

For a bio-fuel to be considered fungible to crude oil-based diesel fuels, it must also meet the standardised chemical and physical properties of these materials, as defined in "*Automotive fuels—Diesel—Requirements and test methods*" European Standard EN 590:2009 and "*Standard Specification for Diesel Fuel Oils*" ASTM D975. These standards define the specification properties required of a diesel fuel in Europe, for example the standard required of a Euro 6 grade diesel oil is shown in Table 1.

TABLE 1

| Property | Unit | Limits Minimum | Limits Maximum | Test Method |
|---|---|---|---|---|
| Cetane number | | 51.0 | | EN ISO 5165 |
| | | | | EN 15195 |
| Cetane index | | 46.0 | | EN ISO 4264 |
| Density at 15° C. | kg/m$^3$ | 820.0 | 845.0 | EN ISO 3675 |
| | | | | EN ISO 12185 |
| Polycyclic aromatic Hydrocarbons | % (m/m) | | 11 | EN 12916 |
| Sulfur content | mg/kg | | 10.0 | EN ISO 20846 |
| | | | | EN ISO 20884 |
| Flash point | ° C. | Above 55 | | EN ISO 2719 |
| Carbon residue (on 10% distillation residue) | % (m/m) | | 0.33 | EN ISO 10370 |
| Ash content | % (m/m) | | 0.01 | EN ISO 6245 |
| Water content | mg/kg | | 200 | EN ISO 12937 |
| Total contamination | mg/kg | | 24 | EN 12662 |
| Copper strip corrosion (3 h at 50° C.) | rating | Class 1 | | EN ISO 2160 |
| Fatty acid methyl ester (FAME) content | % (V/V) | | 7.0 | EN 14078 |
| Oxidation stability | g/m$^3$ | | 25 | EN ISO 12205 |
| | h | 20 | | EN 15751 |
| Lubricity, corrected wear scar diameter (wsd 1,4) at 60° C. | µm | | 460 | EN ISO 12156-1 |
| Viscosity at 40° C. | mm$^2$/s | 2.00 | 4.50 | EN ISO 3104 |

TABLE 1-continued

| Property | Unit | Limits | | Test Method |
|---|---|---|---|---|
| | | Minimum | Maximum | |
| Distillation | | | | EN ISO 3405 |
| % (V/V) recovered at 250° C. | % (V/V) | | <65 | |
| % (V/V) recovered at 350° C. | % (V/V) | 85 | | |
| 95% (V/V) recovered at | ° C. | | 360 | |

Particularly important requirements of any diesel fuel (or hydrocarbon feedstock for use in forming a diesel fuel) are i) the amount of sulphur present, and ii) the freezing point of the material. Combustion of sulphur containing hydrocarbons leads to the formation of sulphur oxides. Sulphur oxides are considered to contribute to the formation of aerosol and particulate matter (soot) which can lead to reduced flow or blockages in filters and component parts of combustion engines. Furthermore, sulphur oxides are known to cause corrosion of turbine blades, and so high sulphur content in a fuel is highly undesirable. The European Standard EN590:2009 states that diesel fuels may contain at most 10 mg/kg of sulphur, however in the US up to 15 mg/kg of sulphur is considered acceptable.

An essential property of any alternative diesel fuel is the fluidity of the material at lower temperatures. The fluidity of fuels can be determined based on the cloud point and the pour point of the material. Diesel fuels contain paraffin wax which melts in the temperature range of between 40° C. and 80° C., thus at lower temperatures paraffin wax begins to solidify, forming paraffin wax crystals. The temperature at which wax begins to precipitate and the fuel becomes cloudy is referred to as the cloud point. As the temperature of the fuel is reduced below the cloud point, more paraffin wax precipitates from solution. At approximately 3° C. to 5° C. below the cloud point (for fuels that do not contain a pour point depressant additive) the fuel can no longer flow. Solid paraffin wax present in diesel fuel can lead to reduced flow or blockages in filters and component parts of combustion engines.

Diesel fuel comprises a mixture of different hydrocarbon compounds, each with its own freezing point, and does not become solid at a specific temperature, unlike water. As the fuel is cooled, the hydrocarbon components with the highest freezing points solidify first, forming wax crystals. Further cooling causes hydrocarbons with lower freezing points to subsequently solidify. Thus, as the fuel cools, it changes from a homogenous liquid to a liquid containing a few hydrocarbon (wax) crystals, to a mixture of liquid fuel and hydrocarbon crystals, and finally to a near-solid hydrocarbon wax. The pour point of a fuel is defined as the minimum temperature in which the oil has the ability to pour down from a beaker. Diesel formed from fossil fuels typically has a pour point of from −35° C. to −15° C., in which fuels having a lower pour point within this range remain fluid at lower temperatures and therefore are acceptable for use in a wider range of environments.

A further essential property of diesel fuels is the cetane number which defines the ignition quality of the fuel. The cetane number is a measure of how readily the fuel will burn under diesel engine conditions. Higher cetane numbers indicate a more volatile fuel providing a shorter ignition delay period. In general, the cetane number of diesel fuels is between 40 and 55, however in Europe the minimum acceptable cetane number is 51. It has been found that fuels having a higher cetane number provide improved fuel combustion, reduce smoke production and emit lower amounts of $NO_x$ and particulates (soot).

It is well understood within this field that the physical properties of a diesel fuel, such as the freezing point, pour point, cetane number and viscosity, and therefore the performance of the fuel in an engine, is linked to both the molecular weight or carbon number and the ratio of different hydrocarbon compounds present. Typically, diesel fuels are primarily composed of paraffin (having a carbon number of $C_{10}$, $C_{14}$ $C_{15}$ and $C_{20}$), naphthene (having a carbon number of $C_{10}$, $C_{15}$ and $C_{20}$), or aromatic (having a carbon number of, $C_{10}$, $C_{15}$ and $C_{20}$) based hydrocarbons.

However, many previously known methods of producing bio-derived fuels result in a wide variety of hydrocarbon compounds and thus fail to meet the requirements of alternative diesel fuel material, or additional refining steps are required which result in increased time and cost of manufacturing such materials.

The bromine number, or bromine index, is a parameter used to estimate the amount of unsaturated hydrocarbon groups present in the material. Unsaturated hydrocarbon bonds present within a bio-derived diesel fuel can be detrimental to the physical properties and performance of the material. Unsaturated carbon bonds can crosslink or react with oxygen to form epoxides. Crosslinking causes the hydrocarbon compounds to polymerise forming gums or varnishes. Gums and varnishes can form deposits within a fuel system or engine, blocking filters and/or tubing supplying fuel to the internal combustion engine. The reduced fuel flow results in a decrease of engine power and can even prevent the engine from starting. Whilst a specific bromine index range is not a standard requirement for diesel fuels, lower bromine index values are clearly beneficial in such materials.

For a bio-derived fuel to be considered a fit for purpose diesel fuel, it must meet the above standardised requirements. However, known methods of producing bio-derived oils typically require further significant and costly refining steps in order to bring the oil to an acceptable specification. Thus, such methods cannot provide an economically competitive alternative to fossil fuels.

Research within this field has previously been focused on indirect methods of forming bio-fuels, comprising, for example i) the fractionation of biomass and fermentation of the cellulosic and hemi-cellulosic fraction to ethanol, or ii) the destructive gasification of the complete biomass to form syngas before subsequent upgrading to methanol or Fischer-Tropsch diesel.

Thermo-conversion methods are currently considered to be the most promising technology in the conversion of biomass to bio-fuels. Thermo-chemical conversion includes the use of pyrolysis, gasification, liquefaction and supercritical fluid extraction. In particular, research has focused on pyrolysis and gasification for forming bio-fuels.

Gasification comprises the steps of heating biomass materials to temperatures of over 430° C. in the presence of oxygen or air in order to form carbon dioxide and hydrogen (also referred to as synthesis gas or syngas). Syngas can then be converted into liquid fuel using a catalysed Fischer-Tropsch synthesis. The Fischer-Tropsch reaction is usually catalytic and pressurised, operating at between 150 and 300° C. The catalyst used requires clean syngas and so additional steps of syngas cleaning are also required.

A typical gasification method comprising a biomass material produces a $H_2$:CO ratio of around 1, as shown in Equation 1 below:

$$C_6H_{10}O_5 + H_2O = 6CO + 6H_2 \quad \text{(Equation 1)}$$

Accordingly, the reaction products are not formed in the ratio of CO to $H_2$ required for the subsequent Fischer-Tropsch synthesis to form bio-fuels ($H_2$:CO ratio of ~2). In order to increase the ratio of $H_2$ to CO, the following additional steps are commonly applied:

An additional water gas shift reaction is used;
Hydrogen gas is added;
Carbon is extracted using gasification;
increased amounts of $CO_2$ are produced by using excess steam: $C_6H_{10}O_5 + 7H_2O = 6CO_2 + 12H_2$. Carbon dioxide can be converted to carbon monoxide through the addition of carbon, referred to as gasification with carbon dioxide, instead of steam.
Unreacted CO is removed and used for forming of heat and/or power.

Overall, the gasification reaction requires multiple reaction steps and additional reactants, and so the energy efficiency of producing biofuel in this manner is low. Furthermore, the increased time, energy requirements, reactants and catalysts required to combine gasification and Fischer-Tropsch reactions greatly increases manufacturing costs.

Of the thermo-conversion processes, pyrolysis methods are considered to be the most efficient pathway to convert biomass into a bio-derived oil. Pyrolysis methods produce bio-oil, char and non-condensable gases by rapidly heating biomass materials in the absence of oxygen. The ratio of products produced is dependent on the reaction temperature, reaction pressure and the residence time of the pyrolysis vapours formed.

Higher amounts of biochar are formed at lower reaction temperatures and lower heating rates; higher amounts of liquid fuel are formed using lower reaction temperatures, higher heating rates and shorter residence times; and fuel gases are preferentially formed at higher reaction temperatures, lower heating rates and longer residence times. Pyrolysis reactions are split into three main categories, conventional, fast and flash pyrolysis, depending on the reaction conditions used.

In a conventional pyrolysis process the heating rate is kept low (around 5 to 7° C./min) heating the biomass up to temperatures of around 275 to 675° C. with residence times of between 7 and 10 minutes. The slower increase in heating typically results in higher amounts of char being formed compared to bio-oil and gases.

Fast pyrolysis comprises the use of high reaction temperatures (between 575 and 975° C.) and high heating rates (around 300 to 550° C./min) and shorter residence times of the pyrolysis vapour (typically up to 10 seconds) followed by rapid cooling. Fast pyrolysis methods increase the relative amounts of bio-oil formed.

Flash pyrolysis comprises rapid devolitalisation in an inert atmosphere, a high heating rate, high reaction temperatures (typically greater than 775° C.) and very short vapour residence times (<1 second). In order for heat to be sufficiently transferred to the biomass materials in these limited time periods, the biomass materials are required to be present in particulate form with diameters of about 1 mm being common. The reaction products formed are predominantly gas fuel.

However, bio-oils produced through a pyrolysis process often comprise a complex mixture of water and various organic compounds, including acids, alcohols, ketones, aldehydes, phenols, esters, sugars, furans, and hydrocarbons, as well as larger oligomers. The presence of water, acids, aldehydes and oligomers are considered to be responsible for poor fuel properties in the bio-oil formed.

Furthermore, the resulting bio-oil can contain 300 to 400 different oxygenated compounds, which can be corrosive, thermally and chemically unstable and immiscible with petroleum fuels. The presence of these oxygenated compounds also increases the viscosity of the fuels and increase moisture absorption.

In order to address these issues, several upgrading techniques have been proposed, including catalytic (hydro) deoxygenation using hydro-treating catalysts, supported metallic materials, and most recently transition metals. However, catalyst deactivation (via coking) and/or inadequate product yields means that further research is required.

Alternative upgrading techniques include emulsification catalytic hydrogenation, fluidised catalysed cracking and/or catalytic esterification. Inevitably, the need for additional refinement steps and additional reactant materials increases both the time and cost associated with such processes both in terms of operating costs and capital expenditure.

Accordingly, there remains a need in the art for a more concise and efficient method of producing a hydrocarbon feedstock from which bio-fuels can be derived. Further, there remains a need to provide a more efficient method of forming a bio-derived diesel fuel, which can meet at least some of the standardised chemical, physical and performance properties of the fossil fuel-based materials. In particular, it would be desirable to provide a more cost-effective method of producing bio-derived fuels and hydrocarbon feedstock, comparable to those produced from fossil fuels.

DESCRIPTION OF THE INVENTION

In a first embodiment, the present invention relates to a process for forming a biomass derived hydrocarbon feedstock, suitable for forming a biodiesel, from a biomass feedstock, comprising the steps of:

a. providing a biomass feedstock;
b. ensuring the moisture content of the biomass feedstock is 10% or less by weight of the biomass feedstock;
c. pyrolysing the low moisture biomass feedstock at a temperature of at least 950° C. to form a mixture of biochar, hydrocarbon feedstock, non-condensable light gases, such as hydrogen, carbon monoxide, carbon dioxide and methane, and water; and
d. separating the hydrocarbon feedstock from the mixture formed in step c.

Preferably, the biomass feedstock comprises cellulose, hemicellulose or a lignin-based feedstock.

Whilst it is possible to use food crops, such as corn, sugar cane and vegetable oil as a source of biomass, it has been suggested that the use of such starting materials can lead to other environmental and/or humanitarian issues. For example, where food crops are used as a biomass source, more land must be dedicated to growing the additional crops required or a portion of the crops currently grown must be diverted for this use, leading to further deforestation or an increase in the cost of certain foods. Accordingly, in a preferred embodiment of the present invention the biomass feedstock is selected from a non-crop biomass feedstock.

In particular, it has been found that suitable biomass feedstocks may be preferably selected from miscanthus, switchgrass, garden trimmings, straw, such as rice straw or wheat straw, cotton gin trash, municipal solid waste, palm fronds/empty fruit bunches (EFB), palm kernel shells, bagasse, wood, such as hickory, pine bark, Virginia pine, red oak, white oak, spruce, poplar, and cedar, grass hay, mesquite, wood flour, nylon, lint, bamboo, paper, corn stover, or a combination thereof.

During combustion of a hydrocarbon feedstock or a bio-fuel, sulphur contained therein may be oxidised and can further react with water to produce sulphuric acid ($H_2SO_4$). The sulphuric acid formed can condense on the metal surfaces of combustion engines causing corrosion. Thus, further or repeated processing steps are required to reduce the sulphur content of bio-oils to a suitable level. This in turn increases the processing time to produce a viable bio-fuel and increases the cost associated with manufacturing these materials. Accordingly, the biomass feedstock is selected from a low sulphur biomass feedstock. In general, non-crop biomass feedstocks contain low amounts of sulphur, however particularly preferred low sulphur biomass feedstocks include miscanthus, grass, and straw, such as rice straw or wheat straw.

The use of a low sulphur biomass feedstock reduces the extent to which the resulting hydrocarbon feedstock will be required to undergo desulphurisation processing in order to meet industry requirements, in some cases the need for a desulphurisation processing step is eliminated.

During the pyrolysis step, the efficiency of heat transfer through the biomass material has been found to be at least partially dependent on the surface area and volume of the biomass material used. Thus, preferably, the biomass feedstock is ground in order break up the biomass material and/or to reduce its particle size, for example through the use of a tube grinder, milled, such as through the use of a hammer mill, knife mill, slurry milling, or resized through the use of a chipper, to the required particle size. Preferably, the biomass feedstock is provided in the form of pellets, chips, particulates or a powder. More preferably, the pellets, chips, particulates or powders have a diameter of from 5 μm to 10 cm, such as from 5 μm to 25 mm, preferably from 50 μm to 18 mm, more preferably from 100 μm to 10 mm. These sizes have been found to be particularly useful with respect to efficient heat transfer. The diameter of the pellets, chips, particulates and powders defined herein relate to the largest measurable width of the material.

It has also been found that, at high temperatures, such as those required during the high-temperature pyrolysis reaction, the presence of smaller particles can result in an increased chance of dust explosions and fires. However, it has been found that by at least partially removing or preventing the formation of biomass pellets, chips, particles or powders with a diameter of less than about 1 mm, the likelihood of dust explosions or fire occurring is significantly reduced. Accordingly, it is preferable for the biomass feedstock (generally in the form of pellets, chips, particulates or powder) to have a diameter of at least 1 mm, such as from 1 mm to 25 mm, 1 mm to 18 mm or 1 mm to 10 μm. The biomass feedstock may comprise surface moisture. Preferably, such moisture is reduced prior to the step of pyrolysing the biomass feedstock. The amount of moisture present in the biomass feedstock will vary depending on the type of biomass material, transport and storage conditions of the material before use. For example, fresh wood can contain around 50 to 60% moisture. The presence of increased amounts of moisture in the biomass feedstock has been found to reduce the efficiency of the pyrolysis step of the present invention as heat is lost through evaporation of the moisture—rather than heating the biomass material itself, thereby reducing the temperature to which the biomass material is heated or increasing the time to heat the biomass material to the required temperature. This in turn affects the desired ratio of pyrolysis products formed in the hydrocarbon feedstock product.

By way of example, the initial moisture content of the biomass feedstock may be from 10% to 50% by weight of the biomass feedstock, such as from 15% to 45% by weight of the biomass feed stock, or for example from 20% to 30% by weight of the biomass feedstock.

Preferably, the moisture content of the biomass feedstock is reduced to 7% or less by weight, such as 5% or less by weight of the biomass feedstock.

Optionally, the moisture of the biomass feedstock is at least partially reduced before the biomass feedstock is ground.

Alternatively, the biomass feedstock may be formed into pellets, chips, particulates or a powder before the moisture content of the biomass feedstock is at least partially reduced to less than 10% by weight, for example where the forming process is a "wet" process or wherein the removal of at least some moisture from the biomass feedstock may be achieved more efficiently by increasing the surface area of the biomass feedstock material.

The amount of moisture present may be reduced through the use of a vacuum oven, a rotary dryer, a flash dryer or a heat exchanger, such as a continuous belt dryer. Preferably, moisture is reduced through the use of indirect heating methods, such as indirect heat belt dryer, an indirect heat fluidised bed or an indirect heat contact rotary steam-tube dryer.

Indirect heating methods have been found to improve the safety of the overall process as the heat can be transferred in the absence of air or oxygen thereby alleviating and/or reducing fires and dust explosions. Furthermore, such indirect heating methods have been found to provide more accurate temperature control which, in turn, allows for better control of the ratio of pyrolysis products formed in the hydrocarbon feedstock product. In preferred processes, the indirect heating method comprises an indirect heat contact rotary steam-tube dryer wherein water vapour is used as a heat carrier medium.

The low moisture biomass feedstock may be pyrolysed at a temperature of at least 1000° C., more preferably at least 1100° C., for example 1120° C., 1150° C., or 1200° C.

In general, the biomass feedstock may be heated by convection heating, microwave heating, electrical heating or supercritical heating. By way of example, the biomass feedstock may be heated through the use of microwave assisted heating, a heating jacket, a solid heat carrier, a tube furnace or an electric heater. Preferably, the heating source is a tube furnace. The tube furnace may be formed from any suitable material, for example a nickel metal alloy.

As noted above, the use of indirect heating of the pyrolysis chamber is preferred as it reduces and/or alleviates the likelihood of dust explosions or fires occurring.

Alternatively or in addition, a heating source is positioned within the pyrolysis reactor in order to directly heat the low moisture biomass feedstock. The heating source may be selected from an electric heating source, such as an electrical spiral heater. It has been found to be beneficial to use two or more electrical spiral heaters within the pyrolysis reactor.

The use of multiple heaters can provide a more homogenous distribution of heat throughout the reactor ensuring a more uniform reaction temperature is applied to the low moisture biomass material.

It has been found to be beneficial for the biomass material from step b. to be transported continuously through the pyrolysis reactor. For example, the biomass material may be transported through the pyrolysis reactor using a conveyor, such as a screw conveyor or a rotary belt. Optionally, two or more conveyors can be used to continuously transport the biomass material through the pyrolysis reactor. A screw conveyor has been found to be particularly useful as the speed at which the biomass material is transported through the pyrolysis reactor, and therefore the residence time in the pyrolysis reactor, can be controlled by varying the pitch of the screw conveyor.

Alternatively or in addition, the residence time of the biomass material within the reactor can be varied by altering the width or diameter of the pyrolysis reactor through which the biomass material is conveyed.

The biomass material may be pyrolysed under atmospheric pressure (including essentially atmospheric conditions). Preferably, the biomass material is pyrolysed in an oxygen-depleted environment in order to avoid the formation on unwanted oxygenated compounds, more preferably the biomass material is pyrolysed in an inert atmosphere, for example the reactor is purged with an inert gas, such as nitrogen or argon prior to the pyrolysis step. The biomass material may be pyrolysed under atmospheric pressure (including essentially atmospheric conditions). Alternatively, the biomass material may be pyrolysed under a low pressure, such as from 850 to 1,000 Pa, preferably 900 to 950 Pa. The resulting pyrolysis gases can subsequently be separated by any known methods within this field, for example through condensation and distillation The application of pressure, such as between 850 to 1,000 Pa, during the pyrolysis step and subsequent condensation and distillation of the pyrolysis gases formed has been found to be beneficial in separating the pyrolysis gases from any remaining solids formed during the pyrolysis reaction, such as biochar. Thus, in some embodiments, means are provided for providing the necessary vacuum pressure and/or removing pyrolysis gases formed.

In particular examples, the biomass material is conveyed in a counter-current direction to any pyrolysis gases formed, and any solid material, such as biochar formed as a result of the pyrolysis step is removed separate to the pyrolysis gases formed. As the hot pyrolysis gases pass through the biomass material, heat is transferred from the pyrolysis gases to the biomass material resulting in at least a minor amount of low-temperature pyrolysis of the biomass material.

In addition, the pyrolysis gases are at least partially cleaned as dust and heavy carbons present in the gases are captured by the biomass material.

Where the pyrolysis step is performed under low pressure conditions, a vacuum may be applied so as to aid the flow of pyrolysis gases in a counter-current direction to the biomass material being conveyed through the pyrolysis reactor, and optionally the removal of the pyrolysis gases.

In some examples, the biomass feedstock from step b. is pyrolysed for a period of from 10 seconds to 2 hours, preferably, from 30 seconds to 1 hour, more preferably from 60 second to 30 minutes, such as 100 seconds to 10 minutes.

In accordance with the present invention, step d. may further comprise the step of separating the biochar from the hydrocarbon feedstock product. In some examples, the separation of biochar from the hydrocarbon feedstock product occurs in the pyrolysis reactor. In other examples, the pyrolysis gases formed are first cooled, for example through the use of a venturi, in order to condense the hydrocarbon feedstock product and the biochar is subsequently separated from the liquid hydrocarbon feedstock product and non-condensable gases formed.

The amount of biochar formed in the pyrolysis step may be from 5% to 20% by weight of the biomass feedstock formed in step b., preferably the amount of biochar formed is from 10 to 15% by weight of the biomass feedstock formed in step b.

The hydrocarbon feedstock product may be at least partially separated from the biochar formed using filtration methods (such as the use of a ceramic filter), centrifugation, cyclone or gravity separation.

In accordance with the present invention, step d. may comprise or additionally comprises at least partially separating water from the hydrocarbon feedstock product. It has been found that the water at least partially separated from the hydrocarbon feedstock further comprises organic contaminants, such as pyroligneous acid. Generally, pyroligneous acid is present in the water at least partially separated from the hydrocarbon feedstock product in amounts of from 10% to 30% by weight of the aqueous pyroligneous acid, preferably, pyroligneous acid is present in an amount of from 15% to 28% by weight of the aqueous pyroligneous acid.

Aqueous pyrolignous acid (also referred to as wood vinegar) mainly comprises water but also contains organic compounds such as acetic acid, acetone and methanol. Wood vinegar is known to be used for agricultural purposes such as, as an anti-microbiological agent and a pesticide. In addition, wood vinegar can be used as a fertiliser to improve soil quality and can accelerate the growth of roots, stems, tubers flowers and fruits in plant. Wood vinegar is also known to have medicinal applications, for example in wood vinegar has antibacterial properties, can provide a positive effect on cholesterol, promotes digestion and can help alleviate acid reflux, heartburn and nausea. Thus, there is a further benefit to the present process in being able to isolate such a product stream.

The water may be at least partially separated from the hydrocarbon feedstock by gravity oil separation, centrifugation, cyclone or microbubble separation.

In accordance with the present invention, step d. may comprise or additionally comprises at least partially separating non-condensable light gases from the hydrocarbon feedstock product. The non-condensable light gases may be separated from the hydrocarbon feedstock product through any known methods within this field, for example by means of flash distillation or fractional distillation.

Generally, the non-condensable light gases may be at least partially recycled. Preferably, the non-condensable light gases separated from the hydrocarbon feedstock product are combined with the biomass feedstock being subjected to pyrolysis (step c.).

In some embodiments of the present invention, it has been found beneficial to further process the hydrocarbon feedstock product to at least partially remove contaminants contained therein, such as carbon, graphene, polyaromatic compounds and tar. The presence of impurities in the biodiesel not only significantly affects its engine performance but also complicates its handling and storage. A filter, such as a membrane filter may be used to remove larger contaminants.

In addition or alternatively, fine filtration may be used to remove smaller contaminants which may be suspended in the hydrocarbon feedstock. By way of example, Nutsche filters may be used to remove smaller contaminants.

The step of filtering the hydrocarbon feedstock may be repeated two or more times in order to reduce the contaminants present to a desired level (for example, until the hydrocarbon feedstock is straw coloured).

Alternatively or in addition, contaminants, such as polycyclic aromatic compounds, may be removed by contacting the hydrocarbon feedstock with an active carbon compound and/or a crosslinked organic hydrocarbon resin. In particular, the activated carbon and/or cross linked organic hydrocarbon resin may be in particulate or pellet form in order to increase contact between the adsorbent and hydrocarbon feedstock, thereby reducing the time required to achieve the desired level of contaminant removal.

However, activated carbon can be costly to regenerate. As an alternative, biochar, for example such as formed in the present process, can be used as a more cost effective and environmentally friendly alternative to activated carbon in order to remove contaminants from the hydrocarbon feed.

As discussed above, cross linked organic hydrocarbon resins may also be used to remove contaminants from the hydrocarbon feedstock product. In particular, crosslinked organic hydrocarbon resins are useful in removing organic-based contaminants through hydrophobic interaction (i.e. van der Waals) or hydrophilic interaction (hydrogen bonding, for examples with functional groups, such as carbonyl functional groups, present on the surface of the resin material). The hydrophobicity/hydrophilicity of the resin adsorbent material is dependent on the chemical composition and the structure of the resin material selected. Accordingly, the specific adsorbent resin can be tailored to the desired contaminants to be removed. Commonly used crosslinked organic hydrocarbon resins for the removal of contaminants present in biofuels include polysulfone, polyamides, polycarbonates, regenerated cellulose, aromatic polystyrenic or polydivinylbenzene, and aliphatic methacrylate. In particular, aromatic polystyrenic or polydivinylbenzene based resin materials can be used to remove aromatic molecules, such as phenols from the hydrocarbon feed.

In addition, adsorption of contaminant materials can be increased by increasing the surface area and porosity of the crosslinked organic polymer resin, and so in preferred embodiments the hydrocarbon feedstock is contacted with crosslinked organic hydrocarbon porous pellets or particles in order to further improve the purity of the treated hydrocarbon feedstock product and improve the efficiency of the purifying step.

Preferably, tar separated from the hydrocarbon feedstock product is recycled and combined with the biomass feedstock in step b. It has been found that the tar resulting from the pyrolysis of the biomass materials primarily comprises phenol-based compositions and a range of further oxygenated organic compounds. This pyrolysis tar can be further broken down by use of heat to at least partially form a hydrocarbon feedstock. Accordingly, by recycling the pyrolysis tar to the biomass feedstock in step b., the percentage yield of hydrocarbon feedstock product obtained from the biomass source can be increased.

The hydrocarbon feedstock product may be contacted with the activated carbon, biochar or crosslinked organic hydrocarbon resin at around atmospheric pressure (approximately 101.3 KPa).

The activated carbon, biochar and/or crosslinked organic hydrocarbon resin may be contacted for any time necessary to sufficiently remove contaminants present within the hydrocarbon feedstock product. It is considered well within the knowledge of the skilled person within this field to determine a suitable contact times for the hydrocarbon feedstock and adsorbent materials. In some examples, the activated carbon, biochar and/or crosslinked organic hydrocarbon resin is contacted with the hydrocarbon feedstock for at least 15 minutes before separation, preferably at least 20 minutes, more preferably at least 25 minutes.

The step of contacting the hydrocarbon feedstock product with activated carbon, biochar and/or cross linked organic hydrocarbon resin may be repeated one or more times, in order to reduce the contaminants present to a suitable level (for example, until the hydrocarbon feedstock is straw coloured).

A second embodiment provides a system for forming a hydrocarbon feedstock from a biomass feedstock, wherein the system comprises:

means for ensuring that the moisture content of the biomass feedstock is less than 10% by weight of the biomass feedstock;

a reactor comprising heating element configured to heat the biomass feedstock to a temperature of at least 950° C. to form a mixture of biochar, hydrocarbon feedstock, non-condensable light gases, such as hydrogen, carbon monoxide, carbon dioxide and methane, and water; and a separator, configured to separate the hydrocarbon feedstock formed from the reaction mixture produced in the reactor.

In accordance with the present invention, the system may further comprises means for grinding the biomass feedstock before entering the reactor in order to reduce the particle size of the material, for example the biomass feedstock may be formed into pellets, chips, particulates or powders wherein the largest particle diameter is from 1 mm to 25 mm, 1 mm to 18 mm or 1 mm to 10 mm. Preferably, the system comprises a tube grinder, a mill, such as a hammer mill, knife mill, slurry milling, or a chipper, to reduce the particle size of the biomass feedstock.

In some examples, the system may further comprise heating means to reduce the moisture content of the biomass feedstock to less than 10% by weight. The heating means may be selected from a vacuum oven, a rotary dryer, a flash dryer or a heat exchanger, such as a continuous belt dryer. Preferably, the heating means are arranged to indirectly heat the biomass feedstock, for example the heating means may be selected from an indirect heat belt dryer, an indirect heat fluidised bed or an indirect heat contact rotary steam-tube dryer.

In accordance with the present invention, the heating element may be configured to heat the biomass feedstock to a temperature of at least 1000° C., more preferably at least 1100° C., for example 1120° C., 1150° C., or 1200° C.

The heating element may comprise microwave assisted heating, a heating jacket, a solid heat carrier, a tube furnace or an electric heater, preferably the heating element comprises a tube furnace.

Alternatively or in addition, the heating element may be positioned within the reactor and is configured to directly heat the biomass feedstock. By way of example, the heating element may be selected from an electric heating element, such as an electrical spiral heater. Preferably, two or more electrical spiral heaters may be arranged within the reactor.

The biomass feedstock may be transported continuously through the reactor, for example the biomass material may be contained on/within a conveyor, such as screw conveyor or a rotary belt. Optionally, two conveyors may be arranged to continuously transport the biomass material through the reactor.

The reactor may be arranged so that the biomass material is heated under atmospheric pressure. Alternatively, the reactor may be arranged to form low pressure conditions, such as from 850 to 1,000 Pa, preferably 900 to 950 Pa. The reactor may be configured such that the reactor is maintained under vacuum in order to aid the removal of pyrolysis gases formed. Preferably, the reactor is configured to continuously transport the biomass material in a counter-current direction to any pyrolysis gases removed from the reactor using the applied vacuum. In this way, any solid material formed at a result of heating, such as biochar, is removed separate to pyrolysis gases formed.

In accordance with the present invention, the system may further comprise cooling means for condensing pyrolysis gases formed in the reactor in order to produce a hydrocarbon feedstock product and non-condensable light gases.

The system may further comprise means for separating the pyrolysis gas formed, for example through distillation.

The separator may be arranged to separate biochar from the hydrocarbon feedstock product. For example, the separator may comprise filtration means (such as the use of a ceramic filter), centrifugation, or cyclone or gravity separation.

In addition, or alternatively, the separator may comprise means for at least partially separating water from the hydrocarbon feedstock product. For example, the separator may comprise gravity oil separation apparatus, centrifugation, cyclone or microbubble separation means.

In addition or alternatively, the separator may comprise means for at least partially separating non-condensable light gases from the hydrocarbon feedstock product, for example the separator may be arranged such that the hydrocarbon feedstock product undergoes flash distillation or fractional distillation.

The separator may be arranged so as to recycle any non-condensable light gases separated from the hydrocarbon feedstock product to the biomass feedstock prior to entering the reactor.

In accordance with the present invention, the system may comprise means for further processing the hydrocarbon feedstock product formed. By way of example, the system may be arranged to remove contaminants present in the hydrocarbon feedstock, such as carbon, graphene and tar. Preferably, the system further comprises a filter, such as a membrane filter which can be used to remove larger contaminants present. In addition or alternatively, the system may further comprise fine filtration means, such as Nutsche filters, to remove smaller contaminants suspended in the hydrocarbon feedstock. Alternatively or in addition, the system may be arranged to contact the hydrocarbon feedstock with an active carbon compound and/or a crosslinked organic hydrocarbon resin in order to further process the hydrocarbon feedstock product produced. The activated carbon and/or crosslinked organic hydrocarbon resin may be in particulate or pellet form in order to increase contact between the adsorbent and hydrocarbon feedstock, thereby reducing the time required to achieve the desired level of contaminant removal. The hydrocarbon feedstock product may be contacted with the activated carbon and/or cross linked organic hydrocarbon resin at around atmospheric pressure (approximately 101.3 KPa). In some examples, the system may be arranged so that the hydrocarbon feedstock product is passed through the further processing means two or more times.

A third embodiment of the present invention relates to a hydrocarbon feedstock obtainable as a product in accordance with the embodiments of the process described above.

Preferably, the hydrocarbon feedstock comprises at least 0.1% by weight of one or more $C_8$ compounds, at least 0.5% by weight of one or more $C_{10}$ compounds, at least 5% by weight of one or more $C_{12}$ compounds, at least 5% by weight of one or more $C_{16}$ compounds and at least 30% by weight of at least one or more $C_{18}$ compounds.

More preferably, the hydrocarbon feedstock comprises at least 0.5% by weight of one or more $C_8$ compounds, at least 2% by weight of one or more $C_{10}$ compounds, at least 6% by weight of one or more $C_{12}$ compounds; at least 6% by weight of one or more $C_{16}$ compounds and/or at least 33% by weight of one or more $C_{18}$ compounds.

The hydrocarbon feedstock preferably has a pour point of $-10°$ C. or less, preferably $-15°$ C. or less, such as $-16°$ C. or less.

The hydrocarbon feedstock preferably comprises 300 ppmw or less, preferably, 150 ppmw or less, more preferably 70 ppmw or less of sulphur.

The hydrocarbon feedstock has been surprisingly found to be particularly suitable for producing high quality bio-fuels, such as jet fuel, diesel and naphtha.

A fourth embodiment of the present invention relates to a process of forming a bio-derived diesel fuel, comprising the steps of:
A. providing a biomass derived hydrocarbon feedstock comprising at least 0.1% by weight of one or more $C_8$ compounds, at least 0.5% by weight of one or more $C_{10}$ compounds, at least 5% by weight of one or more $C_{12}$ compounds, at least 5% by weight of one or more $C_{16}$ compounds and at least 30% by weight of one or more $C_{18}$ compounds;
B. processing the hydrocarbon feedstock to produce a refined bio-oil, wherein the process comprises the steps of:
   i. at least partially removing sulphur containing components from the hydrocarbon feedstock;
   ii. hydro-treating the hydrocarbon feedstock; and
   iii. hydro-isomerising the hydrocarbon feedstock; and
C. fractionating the resulting refined bio-oil to obtain a bio-derived diesel fuel fraction.

Preferably, the hydrocarbon feedstock comprises at least 0.5% by weight of one or more $C_8$ compounds, at least 2% by weight of one or more $C_{10}$ compounds, at least 6% by weight of one or more $C_{12}$ compounds, at least 6% by weight of one or more $C_{16}$ compounds and at least 33% by weight of one or more $C_{18}$ compounds.

More preferably, the hydrocarbon feedstock is formed in accordance with the methods described above.

The step of at least partially removing sulphur containing components from the hydrocarbon feedstock may comprise at least partially removing one or more of thiols, sulphides, disulphides, alkylated derivatives of thiophene, benzothiophene, dibenzothiophene, 4-methyldibenzothiophene, 4,6-dimethyldibenzothiophene, benzonaphthothiophene and benzo[def]dibenzothiophene present in the hydrocarbon feedstock. Preferably, benzothiophene, dibenzothiophene are at least partially removed from the hydrocarbon feedstock.

The step of at least partially removing sulphur containing components from the hydrocarbon feedstock may comprise a hydro-desulphurisation step, preferably a catalytic hydro-desulphurisation step.

The catalyst is preferably selected from nickel molybdenum sulphide (NiMoS), molybdenum, molybdenum disulphide ($MoS_2$), cobalt/molybdenum such as binary combinations of cobalt and molybdenum, cobalt molybdenum sulphide (CoMoS), Ruthenium disulfide ($RuS_2$) and/or a nickel/molybdenum based catalyst. More preferably, the catalyst is selected from a nickel molybdenum sulphide (NiMoS) based catalyst and/or a cobalt molybdenum sulphide (CoMoS) based catalyst.

The catalyst may be a supported catalyst, wherein the support can be selected from a natural or synthetic material. In particular, the support selected from activated carbon, silica, alumina, silica-alumina, a molecular sieve, and/or a zeolite. The use of a support has been found to be beneficial as it enables the catalyst to be more homogeneously distributed throughout the hydrocarbon feed and therefore increases the a mount of catalyst in contact with the hydrocarbon feed. Accordingly, the use of a supported catalyst can reduce the amount of catalyst required for the hydro-desulphurisation reaction, reducing the overall cost (operating and capex) of the process.

The hydro-desulphurisation step may be performed in a fixed bed or trickle bed reactor to increase contact between the hydrocarbon feed and the catalyst present to increase the efficiency of the sulphur removing step.

The hydro-desulphurisation step may be performed at a temperature of from 250° C. to 400° C., preferably from 300° C. and 350° C.

The hydrocarbon feedstock may be pre-heated prior to contacting with the hydrogen gas and, where present the hydro-desulphurisation catalyst. The hydrocarbon feedstock may be pre-heated through the use of a heat exchanger. Alternatively, the hydrocarbon feedstock may be first contacted with the hydrogen gas and, if present, the hydro-desulphurisation catalyst, and subsequently heated to the desired temperature. The hydrocarbon feedstock and hydrogen gas may be heated to the desired temperature using any of the direct or indirect heating methods defined above.

The hydro-desulphurisation step is performed at a reaction pressure of from 4 to 6 MPaG, preferably from 4.5 to 5.5 MPaG, more preferably about 5 MPaG.

During the desulphurisation reaction, sulphur containing components react with hydrogen gas to produce hydrogen sulphide gas ($H_2S$). The hydrogen sulphide gas formed can be separated from the hydrocarbon feedstock by any known method in this field, for example through the use of a gas separator or the application of a slight vacuum, for example a vacuum pressure of less than 6 KPaA, preferably less than 5 KPaA, more preferably less than 4 KPaA, to the reactor vessel.

Optionally, the reduced sulphur hydrocarbon feedstock may then be cooled, by any suitable means known in the art, for example by use of a heat exchanger, before further processing steps are performed.

Trace amounts of hydrogen sulphide remaining in the reduced sulphur hydrocarbon feedstock may subsequently be removed through partial vaporisation, for example through the use of a flash separator at around ambient pressure and the vaporised hydrogen sulphide removed through degassing. Preferably, the hydrocarbon feedstock has a temperature of between 60° C. and 120° C., more preferably the hydrocarbon feedstock has a temperature of between 80° C. and 100° C., during the degassing step. The degassing step may be performed under a vacuum, preferably under a vacuum pressure of less than 6 KPaA, more preferably under a vacuum pressure of less than 5 KPaA, even more preferably under a vacuum pressure of less than 4 KPaA.

Any unreacted hydrogen-rich gas removed during the degassing step may be separated from hydrogen sulphide, for example through the use of an amine contactor. The separated gas may then be beneficially recycled and combined with the hydrocarbon feedstock of step A. By recycling the unreacted hydrogen-gas, the amount of hydrogen gas required to remove sulphur containing components in step i) is reduced, thereby providing a more cost effective process.

The hydro-desulphurisation step may be repeated one or more times in order to achieve the desired sulphur reduction in the hydrocarbon feedstock. However, typically only one hydro-desulphurisation step is required to sufficiently reduce the sulphur content of the hydrocarbon feedstock to the desired level, especially when the feedstock is produced in accordance with the methods described herein above.

The desulphurised hydrocarbon feedstock preferably comprises at least 0.5% by weight of one or more $C_8$ compounds, at least 2% by weight of one or more $C_{10}$ compounds, at least 4% by weight of one or more $C_{12}$ compounds, at least 10% by weight of one or more $C_{16}$ compounds and at least 25% by weight of one or more $C_{18}$ compounds.

More preferably, the desulphurised hydrocarbon feedstock comprises at least 1% by weight of one or more $C_8$ compounds, at least 3% by weight of one or more $C_{10}$ compounds, at least 5% by weight of one or more $C_{12}$ compounds, at least 12% by weight of one or more $C_{16}$ compounds and/or at least 27% by weight of one or more $C_{18}$ compounds.

The desulphurised hydrocarbon feedstock may comprise a sulphur content of less than 5 ppmw, preferably less than 3 ppmw, more preferably less than 1 ppmw.

Preferably, the bromine index of the desulphurised hydrocarbon feedstock has been reduced by at least 30% compared to the hydrocarbon feedstock of step A., preferably by at least 40% compared to the hydrocarbon feedstock of step A., more preferably by at least 50% compared to the hydrocarbon feedstock of step A.

The pour point of the reduced sulphur hydrocarbon feedstock formed may preferably be at least −25° C., preferably at least −30° C., more preferably at least −35° C.

The hydro-treating step of the present invention is used to reduce the number of unsaturated hydrocarbon functional groups present in the hydrocarbon feedstock and to beneficially convert the inventive hydrocarbon feedstock to a more stable fuel with a higher energy density.

The hydro-treating step may be performed at a temperature of from 250° C. to 350° C., preferably from 270° C. to 330° C., more preferably from 280° C. to 320° C. Preferably, the hydrocarbon feedstock is heated prior to contact with the hydrogen gas and, where present, the hydro-treating catalyst. The hydrocarbon feedstock may be pre-heated through the use of a heat exchanger. Alternatively, the hydrocarbon feedstock may be first contacted with the hydrogen gas and, if present, the hydro-treating catalyst, and is subsequently heated to the desired temperature. The hydrocarbon feedstock and hydrogen gas may be heated to the desired temperature using any of the direct or indirect heating methods defined above.

The hydro-treating step may be performed at a reaction pressure of from 4 MPaG to 6 MPaG, preferably from 4.5 MPaG to 5.5 MPaG, more preferably about 5 MPaG.

In general, the hydro-treating treating step further comprises a catalyst. Preferably, the catalyst comprises a metal catalyst selected from Group IIIB, Group IVB, Group VB, Group VIB, Group VIIB, and Group VIII, of the periodic table. In particular, a metal catalyst selected from Group VIII of the periodic table, for example the catalyst may be selected from Fe, Co, Ni, Ru, Rh, Pd, Os, Ir, and/or Pt, such as a catalyst comprising Ni, Co, Mo, W, Cu, Pd, Ru, Pt. Preferably, the catalyst is selected from a CoMo, NiMo or Ni catalyst.

Where the hydro-treating catalyst is selected from a platinum-based catalyst, it is preferred that the hydro-desulphurisation step is performed prior to the hydro-treating step as sulphur contained with the hydrocarbon feedstock can poison platinum-based catalysts and thus reduce the efficiency of the hydro-treating step.

The catalyst may be a supported catalyst, and the support can be optionally selected from a natural or synthetic material. In particular, the support may be selected from activated carbon, silica, alumina, silica-alumina, a molecular sieve, and/or a zeolite. The use of a support has been found to be beneficial as the catalyst can be more homogeneously distributed throughout the hydrocarbon feed, increasing the amount of catalyst in contact with the hydrocarbon feed. Thus, the use of a supported catalyst can reduce the amount of catalyst required for the hydro-treating reaction, reducing the overall cost (operating and capex) of the process.

The hydro-treating step may be performed in a fixed bed or trickle bed reactor in order to increase the contact between the hydrocarbon feedstock and the catalyst present, thereby improving the efficiency of the hydro-saturation reaction.

Optionally, the hydro-treated hydrocarbon feedstock is subsequently cooled, for example by use of a heat exchanger, before any further processing steps are performed.

Preferably, the hydro-treated hydrocarbon feedstock comprises at least 0.5% by weight of one or more $C_8$ compounds, at least 6% by weight of one or more $C_{10}$ compounds, at least 4% by weight of one or more $C_{12}$ compounds, at least 3% by weight of one or more $C_{16}$ compounds and at least 30% by weight of one or more $C_{18}$ compounds.

More preferably, the hydrocarbon feedstock comprises at least 1% by weight of one or more $C_8$ compounds, at least 7% by weight of one or more $C_{10}$ compounds, at least 5% by weight of one or more $C_{12}$ compounds, at least 4% by weight of one or more $C_{16}$ compounds and/or at least 35% by weight of one or more $C_{18}$ compounds.

The bromine index of the hydro-treated hydrocarbon feedstock is preferably significantly reduced compared to the desulphurised hydrocarbon feedstock. For example, the bromine index has been reduced by at least 90%, preferably at least 95%, more preferably at least 99% compared to the bromine index of the desulphurised hydrocarbon feedstock.

The pour point of the resulting hydro-treated hydrocarbon feedstock is preferably less than −25° C., more preferably at less than −30° C., and even more preferably less than −35° C.

The hydro-isomerisation step of the present invention is used to convert straight-chain hydrocarbons to branched hydrocarbons having the same carbon number. Selective hydro-isomerization has been found to be highly desirable and i) improves the octane number, and ii) dewaxes long-chain hydrocarbons thus improving the cetane number and cold flow properties of the fuel to be produced in accordance with the present inventions.

The hydro-isomerisation step is preferably performed at a temperature of from 260° C. to 370° C., preferably from 290° C. to 350° C., more preferably from 310° C. to 330° C. Preferably, the hydrocarbon feedstock is heated prior to contacting the hydrogen gas and, where present, the hydro-treating catalyst. The hydrocarbon feedstock may be pre-heated through the use of a heat exchanger. Alternatively, the hydrocarbon feedstock may be first contacted with the hydrogen gas and, if present, the hydro-treating catalyst and is subsequently heated to the desired temperature. The hydrocarbon feedstock and hydrogen gas may be heated to the desired temperature using any of the direct or indirect heating methods defined above.

The hydro-isomerisation step may be performed at a reaction pressure of from 4 MPaG to 6 MPaG, preferably from 4.5 MPaG to 5.5 MPaG, more preferably about 5 MPaG.

Generally, the hydro-isomerisation step further comprises a catalyst. Preferably, the catalyst comprises a metal selected from Group VIII of the periodic table, such as a catalyst selected from a platinum and/or palladium.

The catalyst may be a supported catalyst, such as one comprising a support selected from a natural or synthetic material. In particular, the support is selected from activated carbon, silica, alumina, silica-alumina, a molecular sieve, and/or a zeolite. The use of support has been found to be beneficial as the catalyst can be more homogeneously distributed throughout the hydrocarbon feed and therefore increasing the amount of catalyst in contact with the hydrocarbon feed. Accordingly, the use of a supported catalyst can reduce the amount of catalyst required for the hydro-isomerisation reaction, reducing the overall cost of the process (both operating and capex).

The hydro-isomerisation step may be performed in a fixed bed or trickle bed reactor in order to increase the contact to between the hydrocarbon feed and the catalyst present, increasing the efficiency of the hydro-isomerisation reaction.

Optionally, the hydro-isomerised hydrocarbon feedstock may then be cooled, for example by use of a heat exchanger, before any further processing steps are performed.

The hydro-isomerisation process may further comprises a degassing step in order to remove any light gases, such as hydrogen, methane, ethane and propane gas present. Unreacted light gases may be separated from the isomerised hydrocarbon feedstock by applying a vacuum pressure to the treated hydrocarbon feedstock, for example a vacuum pressure of less than 6 KPaA, preferably less than 5 KPaA, more preferably less than 4 KPaA. The separated gas may subsequently be recycled and combined with the hydrocarbon feedstock of step A.

The hydro-isomerised hydrocarbon feedstock formed according to the present inventions preferably comprises at least 0.5% by weight of one or more $C_8$ compounds, at least 7.5% by weight of one or more $C_{10}$ compounds, at least 4% by weight of one or more $C_{12}$ compounds, at least 7% by weight of one or more $C_{16}$ compounds and at least 12% by weight of one or more $C_{18}$ compounds.

More preferably, the hydro-isomerised hydrocarbon feedstock comprises at least 1% by weight of one or more $C_8$ compounds, at least 10% by weight of one or more $C_{10}$ compounds, at least 5% by weight of one or more $C_{12}$ compounds, at least 8% by weight of one or more $C_{16}$ compounds and/or at least 15% by weight of one or more $C_{18}$ compounds.

It will be appreciated that other contaminants may still be present in the hydro-isomerised hydrocarbon feedstock, which can be detrimental to the overall physical properties of biofuels produced. For example, nitrogen present in the hydrocarbon fuel can reduce the stability and cetane index of resulting fuels.

Accordingly, the hydro-isomerisation process may further comprise the step of hydro-stabilising the hydro-isomerised hydrocarbon feedstock. The hydro-stabilising step saturates at least some of the remaining olefin and/or polyaromatic compounds in the hydrocarbon feedstock. Thus, such a step preferably reduces the amount of contaminants present in the hydro-isomerised hydrocarbon feedstock, such as olefin compounds, aromatic compounds, diene compounds, as well as nitrogen-containing compounds.

Byway of example, the hydro-stabilisation reaction may be performed at a temperature of from 250° C. to 350° C., preferably from 260° C. to 340° C., more preferably from 280° C. to 320° C. The hydrocarbon feedstock may be heated prior to contacting the hydrogen gas and, where present, the hydro-stabilising catalyst. The hydrocarbon feedstock may be pre-heated through the use of a heat exchanger. Alternatively, the hydrocarbon feedstock may be first contacted with the hydrogen gas and, if present, the hydro-stabilising catalyst and is subsequently heated to the desired temperature. The hydrocarbon feedstock and hydrogen gas may be heated to the desired temperature using any of the direct or indirect heating methods defined above.

The hydro-stabilisation reaction may be performed at a reaction pressure of from 4 MPaG to 6 MPaG, preferably from 4.5 MPaG to 5.5 MPaG, more preferably about 5 MPaG.

Generally, the hydro-stabilisation reaction further comprises a catalyst, preferably a catalyst selected from a Ni, Pt and/or Pd-based catalyst.

The catalyst may be a supported catalyst, and wherein the support may be selected from a natural or synthetic material. In particular, the support may be selected from activated carbon, silica, alumina, silica-alumina, a molecular sieve, and/or a zeolite. The use of support has been found to be beneficial as the catalyst can be more homogeneously distributed throughout the hydrocarbon feed and therefore increasing the amount of catalyst in contact with the hydrocarbon feed. Accordingly, the use of a supported catalyst can reduce the amount of catalyst required for the hydro-stabilising reaction, reducing the overall cost of the process (operating and capex).

The hydro-stabilisation step may be performed in a fixed bed or trickle bed reactor in order to increase the contact between the hydrocarbon feed and the catalyst present in order to increase the efficiency of the hydro-stabilisation reaction.

Optionally, the refined bio-oil formed may then be cooled, for example by use of a heat exchanger, before any further processing steps are performed.

The bromine index of the refined bio-oil is preferably less than that of the hydro-treated hydrocarbon feedstock, more preferably the hydro-isomerised hydrocarbon feedstock has no measureable bromine index.

The pour point of the refined bio-oil may be less than −45° C., preferably less than −50° C., more preferably less than −54° C.

The fractionation step of the present invention can separate the refined bio-oil into the respective naphtha, jet fuel and/or heavy diesel fractions. The fractionation method may be performed using any standard methods known in the art, for example through the use of a fractionation column.

The fractionation step may comprise separating a first fractionation cut having a cut point of between 110° C. and 190° C., preferably between 130° C. and 180° C., such as approximately 170° C. of the refined bio-oil at atmospheric pressure (i.e. approximately 101.3 KPa). Alternatively, the fractionation step may be performed at a pressure of from 850 to 1000 Pa, preferably 900 to 950 Pa. The hydrocarbons in the first fractionation cut may be subsequently cooled and condensed. The first cut fraction is typically a bio-derived naphtha fuel.

Preferably, the fractionation step also comprises the step of forming a second fractionation cut of the refined bio-oil, with a cut point between 280° C. and 320° C., preferably from 290° C. to 310° C., more preferably about 300° C.

The second fractionation cut is a bio-derived jet fuel, preferably am A1 grade jet fuel. Preferably, the physical and chemical properties of the second fractionation cut meet at least some of the standardised requirements of a jet fuel.

The remaining bio-oil in the bottom stream is a bio-derived diesel fuel.

The fuel collected from the bottom stream may comprise from 10 to 30% by weight of the refined bio-oil, preferably from 15 to 25% by weight of the refined bio-oil, more preferably about 20% by weight of the refined bio-oil.

A fifth embodiment of the present invention relates to a system for forming a bio-derived diesel fuel from a bio-derived hydrocarbon feedstock, wherein the system comprises:

means for at least partially removing sulphur containing components from the hydrocarbon feedstock;

means for hydro-treating the hydrocarbon feedstock; and means for hydro-isomerising the hydrocarbon feedstock; and a separator configured to separate a bio-derived diesel fuel fraction from a refined bio-oil.

The means for at least partially removing sulphur containing components from the hydrocarbon feedstock may comprise an inlet for supplying hydrogen gas to the reactor. The reactor may also comprise a hydro-desulphurisation catalyst, preferably a hydro-desulphurisation catalyst as defined above. In some examples, the means for at least partially removing sulphur components from the hydrocarbon feedstock may comprise a heating element arranged to heat the hydrocarbon feedstock to a temperature of from 250° C. to 400° C., preferably from 300° C. and 350° C. Optionally, the heating element may be arranged so as to heat the hydrocarbon feedstock to the required temperature before entering the reactor, byway of example the heating element may be selected from a heat exchanger. Alternatively, the heating element may be arranged so as to heat hydrocarbon feedstock to the required temperature after contact with the hydrogen gas and, where present, the hydro-desulphurisation catalyst. Where the hydrocarbon feed is heated subsequently to entering the reactor, the heating element may be selected from any of the direct or indirect heating methods defined above. In some examples, the means for least partially removing sulphur containing components from the hydrocarbon feedstock may be maintained under pressure a of from 4 to 6 MPaG, preferably from 4.5 to 5.5 MPaG, more preferably a bout 5 MPaG.

The reactor may further comprise means for removing hydrogen sulphide gas formed during the desulphurisation process, for example the reactor may further comprise a gas separator arranged to provide a slight vacuum, for example a vacuum pressure of less than 6 KPaA, more preferably a vacuum pressure of less than 5 KPaA, even more preferably a vacuum pressure of less than 4 KPaA, in order to aid the removal hydrogen sulphide gas present.

The system may further comprise cooling means, for example a heat exchanger, in order to cool the reduced sulphur hydrocarbon feedstock before further processing steps are performed.

Optionally, the system may further comprise means for partially vaporising the reduced sulphur hydrocarbon feedstock in order to remove trace amounts of hydrogen sulphide present. By way of example, the partially vaporising means may comprise a flash separator maintained at ambient pressure and a degasser to remove the vaporised hydrogen sulphide. The partially vaporising means may comprise a heating element arranged so as to heat the hydrocarbon feedstock to a temperature of between 60° C. and 120° C., more preferably a temperature of between 80° C. and 100° C., during the degassing step. Optionally, the degasser may be maintained under a vacuum pressure of less than 6 KPaA, more preferably under a vacuum pressure of less than 5 KPaA, even more preferably under a vacuum pressure of less than 4 KPaA.

Preferably, the reactor is configured to recycle any unreacted hydrogen-gas present following the desulphurisation step to the bio-derived hydrocarbon feedstock entering the reactor. In this way, the amount of hydrogen gas required to remove sulphur containing components in the bio-derived hydrocarbon feedstock is reduced, providing a more cost-effective system.

In some examples, the reactor is arranged such that the hydrocarbon feedstock flows through the means for at least partially removing sulphur containing components two or more times.

The means for hydro-treating the hydrocarbon feedstock may comprise a hydro-treating catalyst, for example a hydro-treating catalyst as defined above. The hydro-treating means may further comprise a heating element arranged to heat the hydrocarbon feedstock to a temperature of from 250° C. to 350° C., preferably from 270° C. to 330° C., more preferably from 280° C. to 320° C. Optionally, the heating element may be arranged so as to heat the hydrocarbon feedstock to the required temperature before contacting the means for hydro-treating the hydrocarbon feedstock, by way of example the heating element may be selected from a heat exchanger. Alternatively, the heating element may be arranged so as to heat the hydrocarbon feedstock to the required temperature after contact with the hydrogen gas and, where present, the hydro-treating catalyst. Where the hydrocarbon feed is heated subsequent to contacting the hydro-treating means, the heating element may be selected from any of the direct or indirect heating methods defined above. In some examples, when used to perform a hydro-treating step, the reactor may be maintained under a pressure of from 4 to 6 MPaG, preferably from 4.5 to 5.5 MPaG, more preferably about 5 MPaG.

The system may further comprise cooling means, for example a heat exchanger in order to cool the reduced hydro-treated hydrocarbon feedstock before further processing steps are performed.

The means for hydro-isomerising the hydrocarbon feedstock may comprise a hydro-isomerisation catalyst, for example a hydro-isomerisation catalyst as defined above. The means for hydro-isomerising the hydrocarbon feedstock may comprise a heating element arranged to heat the hydrocarbon feedstock to a temperature of from 260° C. to 370° C., preferably from 290° C. to 350° C., more preferably from 310° C. to 330° C. Optionally, the heating element may be arranged so as to heat the hydrocarbon feedstock to the required temperature before contacting the means for hydro-isomerising the hydrocarbon feedstock, by way of example the heating element may be selected from a heat exchanger. Alternatively, the heating element may be arranged so as to heat the hydrocarbon feedstock to the required temperature after contact with the hydrogen gas and, where present, the hydro-isomerisation catalyst. Where the hydrocarbon feedstock is heated subsequent to contacting the hydro-isomerising means, the heating element may be selected from any of the direct or indirect heating methods defined above. In some examples, when used to perform a hydro-isomerising step, the reactor may be maintained under a pressure of from 4 to 6 MPaG, preferably from 4.5 to 5.5 MPaG, more preferably about 5 MPaG.

The system may further comprise cooling means, for example a heat exchanger in order to cool the hydro-isomerised hydrocarbon feedstock before further processing steps are performed.

The hydro-isomerising means may further comprise degassing means in order to remove any unreacted hydrogen gas present. Preferably, the degassing means are maintained under a vacuum pressure of less than 6 KPaA, preferably less than 5 KPaA, more preferably less than 4 KPaA.

The reactor may be configured to recycle any unreacted hydrogen-gas present following the hydro-isomerisation step to the bio-derived hydrocarbon feedstock entering the reactor. In this way, the amount of hydrogen gas required to remove sulphur containing components in the bio-derived hydrocarbon feedstock is reduced, providing a more cost-effective system.

Preferably, the separator is configured to separate a first fractionation cut of the refined bio-oil at a cut point of between 110° C. and 170° C., preferably between 130° C. and 160° C., such as approximately 150° C. at atmospheric pressure (i.e. approximately 101.3 KPa). In some examples, the separator further comprises cooling means in order to cool and condense the separated first fractionation cut.

The separator may further be arranged so as to form a second fractionation cut of the refined bio-oil at a cut point of between 280° C. and 320° C., preferably from 290° C. to 310° C., more preferably about 300° C. Again, the separator may further comprise means of cooling and condensing the second fractionation cut, for example a condenser. The second fractionation cut produced is a bio-derived jet-fuel, preferably an A1 grade bio-derived jet fuel. The separator further comprises means for collecting the bottom stream following the second fractionation cut, wherein the bottom stream is a bio-derived diesel fuel.

A sixth embodiment of the present invention provides a desulphurised hydrocarbon feedstock, obtainable by the processes described herein, wherein the feedstock comprises at least 0.5% by weight of one or more $C_8$ compounds, at least 2% by weight of one or more $C_{10}$ compounds, at least 4% by weight of one or more $C_{12}$ compounds, at least 10% by weight of one or more $C_{16}$ compounds and at least 25% by weight of one or more $C_{18}$ compounds.

Preferably the desulphurised hydrocarbon feedstock comprises at least 1% by weight of one or more $C_8$ compounds, at least 3% by weight of one or more $C_{10}$ compounds, at least 5% by weight of one or more $C_{12}$ compounds, at least 12% by weight of one or more $C_{16}$ compounds and/or at least 27% by weight of one or more $C_{18}$ compounds.

A seventh embodiment of the present invention provides a hydro-treated hydrocarbon feedstock, obtainable by the processes described herein, wherein the feedstock comprises at least 0.5% by weight of one or more $C_8$ compounds, at least 6% by weight of one or more $C_{10}$ compounds, at least 4% by weight of one or more $C_{12}$ compounds, at least 3% by weight of one or more $C_{16}$ compounds and at least 30% by weight of one or more $C_{18}$ compounds.

Preferably, the hydro-treated hydrocarbon feedstock comprises at least 1% by weight of one or more $C_8$ compounds, at least 7% by weight of one or more $C_{10}$ compounds, at least 5% by weight of one or more $C_{12}$ compounds, at least 4% by weight of one or more $C_{16}$ compounds and/or at least 35% by weight of one or more $C_{18}$ compounds.

An eighth embodiment of the present invention relates to a hydro-isomerised hydrocarbon feedstock, obtainable by the processes described herein, wherein the feedstock comprises at least 0.5% by weight of one or more $C_8$ compounds, at least 7.5% by weight of one or more $C_{10}$ compounds, at least 4% by weight of one or more $C_{12}$ compounds, at least 7% by weight of one or more $C_{16}$ compounds and at least 12% by weight of one or more $C_{18}$ compounds.

Preferably, the hydro-isomerised hydrocarbon feedstock comprises at least 1% by weight of one or more $C_8$ compounds, at least 10% by weight of one or more $C_{10}$ compounds, at least 5% by weight of one or more $C_{12}$ compounds, at least 8% by weight of one or more $C_{16}$ compounds and/or at least 15% by weight of one or more $C_{18}$ compounds.

A further ninth embodiment of the present invention provides a refined bio-oil, obtainable by the processes described herein, wherein the refined bio-oil formed comprises at least 7.5% by weight of one or more $C_{10}$ compounds, at least 4% by weight of one or more $C_{12}$ compounds, at least 7% by weight of one or more $C_{15}$ compounds and at least 12% by weight of one or more $C_{18}$ compounds.

Preferably, the refined bio-oil comprises at least 10% by weight of one or more $C_{10}$ compounds, at least 5% by weight of one or more $C_{12}$ compounds, at least 8% by weight of one or more $C_{15}$ compounds and/or at least 15% by weight of one or more $C_{18}$ compounds.

Preferably, the refined bio-oil has a pour point of −45° C. or less, preferably −50° C. or less, more preferably −54° C. or less.

A tenth embodiment of the present invention relates to a bio-derived diesel fuel formed by the process described herein. Preferably, the bio-derived diesel fuel is formed entirely from a biomass feedstock, more preferably the bio-derived diesel fuel is formed entirely from a non-crop biomass feedstock.

The bio-derived diesel fuel may comprise at least 0.25% by weight of one or more $C_{15}$ compounds, at least 5% by weight of one or more $C_{15}$ compounds, at least 24% by weight of one or more $C_{17}$ compounds and/or at least 45% by weight of one or more $C_{18}$ compounds.

More preferably, the bio-derived diesel fuel comprises at least 0.5% by weight of one or more $C_{15}$ compounds, at least 6.5% by weight of one or more $C_{16}$ compounds, at least 26% by weight of one or more $C_{17}$ compounds and/or at least 50% by weight of one or more $C_{18}$ compounds.

It has been surprisingly found that a bio-derived diesel fuel produced in accordance with the processes of the present inventions meets the criteria of D-2 grade diesel fuel. Preferably, the pour point of the bio-derived diesel fuel is −40° C. or less, preferably −42° C. or less, more preferably −45° C. or less.

The bio-derived diesel fuel may have a cetane number of at least 60, preferably at least 65, more preferably a cetane number of at least 70.

The bio-derived diesel fuel preferably comprises 10 ppmw or less of sulphur, preferably 5 ppmw or less of sulphur, more preferably 1 ppmw or less of sulphur.

Preferably, the bio-derived diesel fuel has no measurable bromine index.

It will be appreciated that although it is technically not essential, the bio-derived diesel fuel of the present invention may be blended with other materials (such a fossil fuel derived fuel materials) in order to meet current fuel standards. By way of example such blending may be up to 50%. However, the surprising quality of the fuel of the present invention makes it feasible for the first time to be able to avoid such processes.

The present inventions will now be described with reference to the following non limiting examples, and with reference to the accompanying drawings, in which.

EXAMPLES

Forming a Bio-Derived Diesel Fuel from a Hydrocarbon Feedstock

Example 1—Filtering a Bio-Derived Hydrocarbon Feedstock

A bio-derived hydrocarbon feedstock was formed in accordance with the disclosure of the present invention. The hydrocarbon feedstock mainly comprised hydrocarbon compounds but also comprised minor amounts of contaminants such as ta r of various sizes, sulphur containing compound, ammonia containing compounds, halogen derivatives, oxygenates and water. The pour point of the feedstock was measured as approximately −17° C., the sulphur content was measured as approximately 67 ppmw and the bromine content was measured as 7×10³ mgBr/100 ml.

The hydrocarbon feedstock was filtered under the following conditions in accordance with the present invention.

The hydrocarbon feedstock was contacted with an active carbon powder under ambient conditions for at least 10 minutes. The hydrocarbon feedstock was subsequently separated from the active carbon powder through filtration. The process of contacting the hydrocarbon feedstock with an active carbon powder and separating the hydrocarbon feedstock was then repeated.

The resulting hydrocarbon feedstock showed that the levels of heavy tars and some harmful species, such as nitrogen-containing compounds, had been reduced to an acceptable level in accordance with the requirements of an Euro 6 standard diesel fuel, as set out in Table 1 above.

Example 2—Hydro-Desulphurisation of a Filtered Hydrocarbon Feedstock

The filtered hydrocarbon feedstock was reacted with hydrogen gas at a temperature of from 300 and 350° C., under a reaction pressure of 5 MPaG and wherein the recirculating hydrogen gas to hydrocarbon feedstock ratio was 500 to 1,000 NV/NV. The liquid space velocity of the reaction was maintained at 0.5-2 V/V/hr and the $H_2S$ concentration was maintained at a level of 150 to 250 ppmV. The hydro-desulphurisation reaction was catalysed using a NiMoS catalyst supported on a porous $Al_2O_3$ substrate.

Following the hydro-desulphurisation reaction the resulting hydrocarbon feedstock was cooled and first flashed at ambient temperature. The hydrocarbon feedstock was subsequently heated to a temperature of 80 to 100° C. and degassed at a vacuum pressure of less than 5 KPaA to remove trace amounts of $H_2S$ present.

Figure 1:
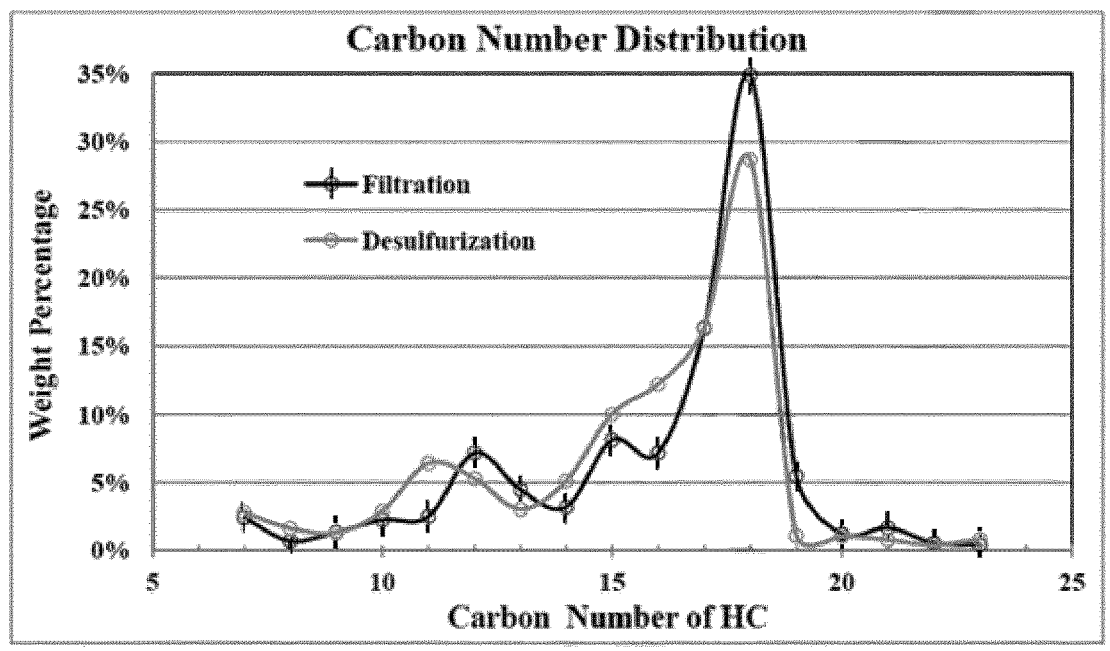
FIG. 1 illustrates the carbon number distribution of a filtered hydrocarbon feedstock and a reduced sulphur hydrocarbon feedstock formed in accordance with the present invention.

The sulphur content of the de-sulphurised hydrocarbon was significantly reduced and was below the measurable detection limit (~1 ppmw). The bromine index of the de-sulphurised hydrocarbon feedstock was reduced to about half of the filtered hydrocarbon feedstock, approximately $4 \times 10^3$ mgBr/100 ml. The pour point of the de-sulphurised hydrocarbon feedstock was significantly improved and was reduced to −35° C. No significant cracking occurred as a result of the de-sulphurisation process, as illustrated in FIG. 1.

Example 3—Hydro-Treatment of the De-Sulphurised Hydrocarbon Feedstock

Hydro-treatment of the de-sulphurised hydrocarbon feedstock was performed at a reaction temperature of from 280 to 320° C. and a reaction pressure of approximately 5 MPaG, wherein the recirculated hydrogen gas to de-sulphurised hydrocarbon feedstock ratio was from 500 to 1,000 NV/NV and a liquid space velocity was from 1 to 1.5 V/V/hr. The hydro-treatment was performed in a trickle bed reactor. A Ni catalyst supported on a porous $Al_2O_3$ substrate was used to catalyse the hydro-treatment step.

Figure 2:
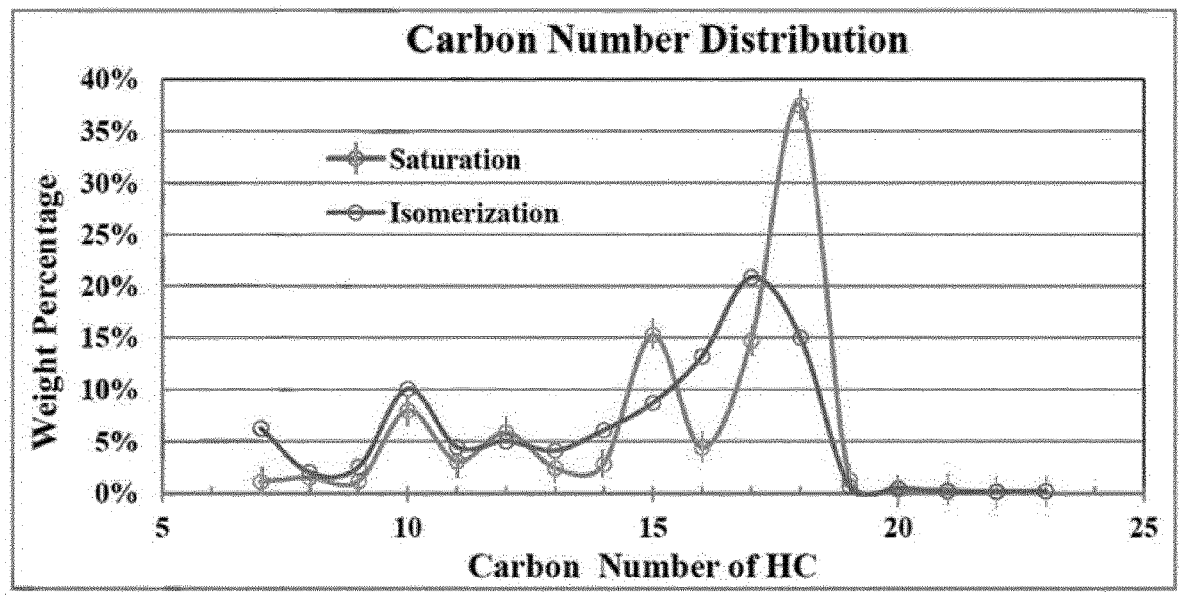
FIG. 2 illustrates the carbon number distribution of a hydro-treated hydrocarbon feedstock and a refined bio-oil following an isomerisation process formed in accordance with the present invention.
Figure 3:
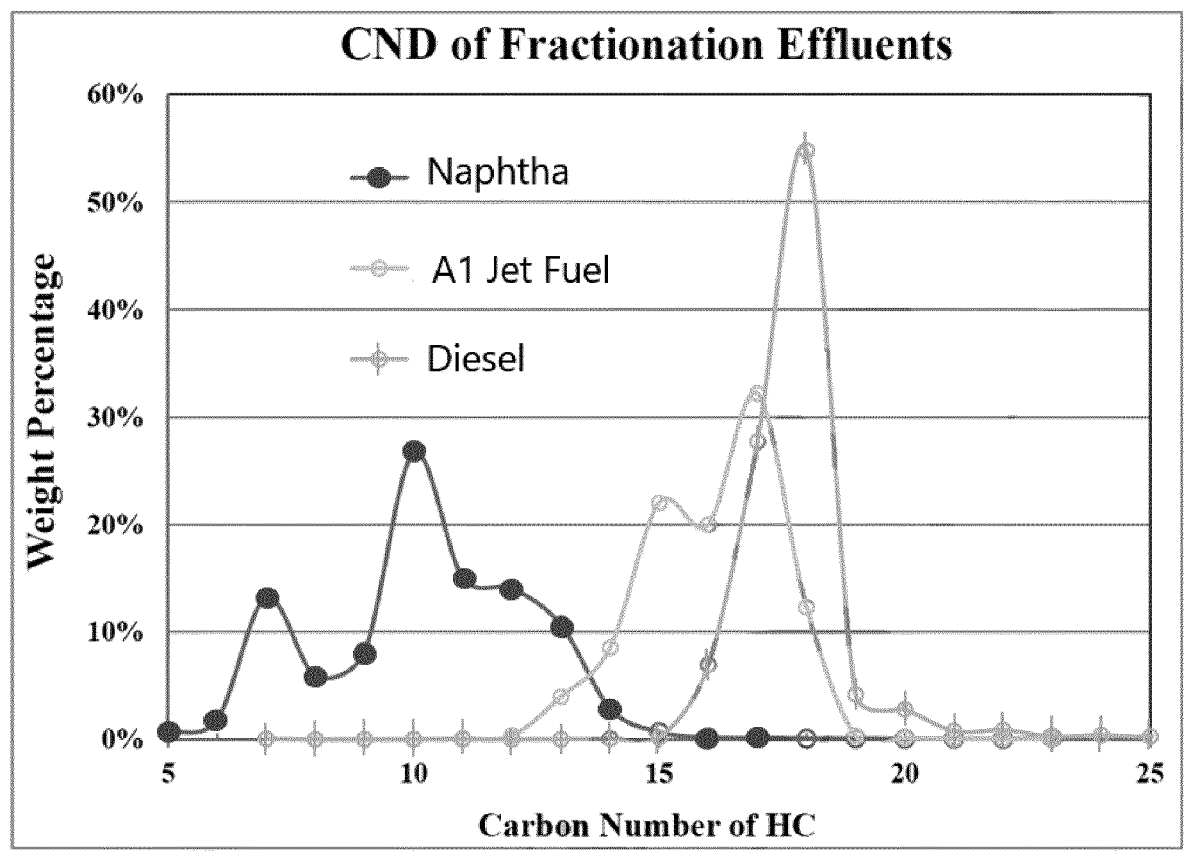
FIG. 3 illustrates the carbon number distribution of the bio-derived naphtha, jet fuel and diesel formed.

The carbon number distribution of the hydro-treated hydrocarbon feedstock is illustrated in FIG. 2. The bromine index of the hydro-treated hydrocarbon feedstock was, again, significantly reduced compared to the hydro-desulphurised hydrocarbon feedstock to approximately 10 mgBr/100 ml. The pour point of the de-sulphurised hydrocarbon feedstock was maintained at −35° C.

Example 4—Hydro-Isomerising the Hydro-Treated Hydrocarbon Feedstock

The hydro-isomerisation reaction was performed at a reaction temperature of from 310 to 330° C. and a reaction pressure of approximately 5 MPaG, with a recirculating hydrogen gas to hydrocarbon feed ratio of 500 to 1,000 NV/NV and a liquid space velocity of 0.5 to 1 V/V/hr. The reaction was performed on a trickle bed reactor using a supported Pt/Pd catalyst.

The hydro-isomerised hydrocarbon feedstock was subsequent processed using a hydro-stabilisation treatment. The hydro-stabilisation treatment was performed at a reaction temperature of from 280 to 320° C. and a reaction pressure of approximately 5 MPaG, with a recirculating hydrogen gas to hydrocarbon feed ratio of 500 to 1,000 NV/NV and a liquid space velocity of 1 to 1.5 V/V/hr. The hydro-stabilisation process was performed using a trickle bed reactor and a Ni catalyst supported on a porous $Al_2O_3$ substrate.

The carbon number distribution of the refined bio-oil formed is illustrated in FIG. 2. The bromine index of the resulting refined bio-oil was below the measureable detection limit. The pour point of the hydro-stabilised refined bio-oil was further reduced to below −54° C.

As a result of the refining process, a small amount (<5 wt %) of liquid petroleum gas (LPG) was also formed.

Example 5—Fractionating the Refined Bio-Oil to Obtain a Bio-Derived Diesel Fuel

The refined bio-oil was first fractionated using a distillation tower under ambient pressure with a cut point of 150° C. Approximately 20 wt % of the refined bio-oil was separated as naphtha from the stream from the top of the distillation tower.

The stream removed from the bottom of the distillation tower was further fractionated under vacuum with a cut point of 300° C. The stream collected from the top of the distillation tower was A1 grade jet fuel, accounting for approximately 50 wt % of the refined bio-oil. The stream collected from the bottom of the distillation tower was a bio-derived diesel fuel.

The invention claimed is:

1. A process for forming a biomass derived hydrocarbon feedstock suitable for forming bio-diesel, from a biomass feedstock, comprising the steps of:
   a. providing a biomass feedstock;
   b. ensuring the moisture content of the biomass feedstock is 10% or less by weight of the biomass feedstock;
   c. pyrolysing the low moisture biomass feedstock at a temperature of in excess of 1000° C. to form a mixture of biochar, hydrocarbon feedstock, non-condensable light gases, such as hydrogen, carbon monoxide, carbon dioxide and methane, and water; and
   d. separating the hydrocarbon feedstock from the mixture formed in step c.

2. A process according to claim 1, wherein the biomass feedstock comprises cellulose, hemicellulose or lignin-based feedstocks, preferably wherein the biomass feedstock is a non-food crop biomass feedstock, such as wherein the non-crop biomass feedstock is selected from miscanthus, switchgrass, garden trimmings, straw, such as rice straw or wheat straw, cotton gin trash, municipal solid waste, palm fronds/empty fruit bunches (EFB), palm kernel shells, bagasse, wood, such as hickory, pine bark, Virginia pine, red oak, white oak, spruce, poplar, and cedar, grass hay, mesquite, wood flour, nylon, lint, bamboo, paper, corn stover, or a combination thereof.

3. A process according to claim 1, wherein the biomass feedstock is in the form of pellets, chips, particulates or a powder, for example, wherein the pellets, chips, particulates or powder have a diameter of from 5 μm to 10 cm.

4. A process according to claim 1, wherein initial moisture content of the biomass feedstock is up to 50% by weight of the biomass feedstock.

5. A process according to claim 1, wherein the moisture content of the biomass feedstock is reduced to 7% or less by weight.

6. A process according to claim 1, wherein the step of ensuring the moisture content of the biomass feedstock is 10% or less by weight of the biomass feedstock comprises reducing the moisture content of the biomass feedstock, such as wherein the moisture content of the biomass feedstock is reduced by use of a vacuum oven, a rotary dryer, a flash dryer or a heat exchanger, such as a continuous belt dryer, for example, wherein the moisture content of the biomass feedstock is reduced through the use of indirect heating, for example by using an indirect heat belt dryer, an indirect heat fluidised bed or an indirect heat contact rotary steam-tube dryer.

7. A process according to claim 1, wherein the low moisture biomass is pyrolysed at atmospheric pressure; or wherein the low moisture biomass is pyrolysed under a pressure of from 850 to 1000 Pa and, optionally, wherein the pyrolysis gases formed are separated through distillation.

8. A process according to claim 1, wherein the low moisture biomass feedstock is pyrolysed for a period of from 10 seconds to 2 hours.

9. A process according to claim 1, wherein step d. comprises at least partially separating biochar from the hydrocarbon feedstock product, optionally wherein biochar is at least partially separated from the hydrocarbon feedstock product by filtration (such as by use of a ceramic filter), centrifugation, or cyclone or gravity separation, for example, wherein the pyrolysis reactor is arranged such that the low moisture biomass is conveyed in a counter-current direction to any pyrolysis gases formed, and optionally wherein biochar formed as a result of the pyrolysis step leaves pyrolysis reactor separate to the pyrolysis gases, and optionally wherein the pyrolysis gases are subsequently cooled, for example through the use of a venturi, to condense the hydrocarbon feedstock product; or wherein step d. comprises at least partially separating water from the hydrocarbon feedstock product, preferably the water at least partially separated from the hydrocarbon feedstock product further comprises organic contaminants, more preferably the water at least partially separated from the hydrocarbon feedstock product is a pyroligneous acid, and optionally wherein water is at least partially separated from the hydrocarbon feedstock product by gravity oil separation, centrifugation, cyclone or microbubble separation; or wherein step d. comprises at least partially separating non-condensable light gases from the hydrocarbon feedstock product, and optionally wherein non-condensable light gases are at least partially separated from the hydrocarbon feedstock product by use of flash distillation or fractional distillation, and optionally wherein the separated non-condensable light gases are recycled and optionally combined with the low moisture biomass feedstock in step c.

10. A process according to claim 1, further comprising the step of filtering the hydrocarbon feedstock product to at least partially remove contaminants, such as carbon, graphene, polyaromatic compounds and/or tar, contained therein, and optionally wherein the filtration step comprises the use of a membrane filter to remove larger contaminants, for example, wherein the filtration step comprises fine filtration to remove smaller contaminants, and for example by using a Nutsche filter.

11. A process according to claim 10, wherein the filtration step comprises contacting the hydrocarbon feedstock product with an active carbon compound and/or a crosslinked organic hydrocarbon resin and subsequently separating the hydrocarbon feedstock product from the active carbon and/or crosslinked organic hydrocarbon resin compound though filtration, and optionally wherein the active carbon compound and/or crosslinked organic hydrocarbon resin is contacted with the hydrocarbon feedstock product under ambient conditions; and/or wherein the active carbon compound and/or crosslinked organic hydrocarbon resin is contacted with the hydrocarbon feedstock product for at least 15 minutes before separation; and/or wherein the step of filtering the hydrocarbon feedstock is performed once or is repeated one or more times.

12. A process according to claim 10, wherein the tar removed from the hydrocarbon feedstock is recycled and optionally combined with the low moisture biomass feedstock in step c.

13. A process of forming a bio-derived diesel fuel, comprising the steps of:
   A. providing a biomass derived hydrocarbon feedstock produced according to claim 1;
   B. processing the hydrocarbon feedstock to produce a refined bio-oil, wherein the process comprises the steps of:
      i. at least partially removing sulphur containing components from the hydrocarbon feedstock;
      ii. hydro-treating the hydrocarbon feedstock; and
      iii. hydro-isomerising the hydrocarbon feedstock; and
   C. fractionating the resulting refined bio-oil to obtain a bio-derived diesel fuel fraction.

14. A process according to claim 13, wherein the sulphur removal step comprises a catalytic hydro-desulphurisation step, for example, wherein the catalyst is part of a fixed bed or a trickle bed reactor, and preferably wherein the catalyst is selected from a nickel molybdenum sulphide (NiMoS), molybdenum, molybdenum disulphide (MoS2), cobalt/molybdenum, cobalt molybdenum sulphide (CoMoS) and/or a nickel/molybdenum based catalyst, and preferably wherein the catalyst is selected from a nickel molybdenum sulphide (NiMoS) based catalyst, such as wherein the catalyst is a supported catalyst, such as by means of a support selected from activated carbon, silica, alumina, silica-alumina, a molecular sieve, and/or a zeolite.

15. A process according to claim 14, wherein the hydro-desulphurisation step is performed at a temperature of from 250° C. to 400° C.; and/or wherein the hydro-desulphurisation step is performed at a reaction pressure of from 4 to 6 MPaG.

16. A process according to claim 13, wherein the catalytic hydro-desulphurisation process further comprises the step of degassing the reduced sulphur hydrocarbon feedstock to remove hydrogen disulphide gas, and optionally wherein the degassing step removes hydrogen formed during the catalytic hydro-desulphurisation process, and optionally wherein the hydrogen is recycled to the hydrocarbon feedstock of step A.

17. A process according to claim 13, wherein the hydro-treating step is performed at a temperature of from 250° C. to 350° C.; and/or wherein the hydro-treating step is performed at a reaction pressure of from 4 MPaG to 6 MPaG; and/or wherein the hydro-treating process further comprises a catalyst and optionally wherein the catalyst is a supported catalyst.

18. A process according to claim 13, wherein the hydro-isomerisation step is performed at a temperature of from 260° C. to 370° C.; and/or wherein the hydro-isomerisation step is performed at a reaction pressure of from 4 MPaG to 6 MPaG; and/or wherein the hydro-isomerisation step further comprises a catalyst, and optionally wherein the catalyst is a supported catalyst.

19. A process according to claim 13, wherein hydro-isomerisation process further comprises the step of degassing the hydro-isomerised hydrocarbon feedstock to remove light gases, such as hydrogen, methane, ethane and propane gas present, and optionally wherein the light gases are recycled to the hydrocarbon feedstock of step A.

20. A process according to claim 13, wherein the fractionation step comprises separating a first fractionation cut having a cut point of between 110° C. and 170° C., of the refined bio-oil under atmospheric pressure, and optionally wherein the method comprises forming a second fractionation cut of the refined bio-oil, with a cut point between 280° C. and 320° C., wherein the bottom stream is collected as a bio-derived diesel fuel.

* * * * *